United States Patent Office 2,701,638
Patented Feb. 8, 1955

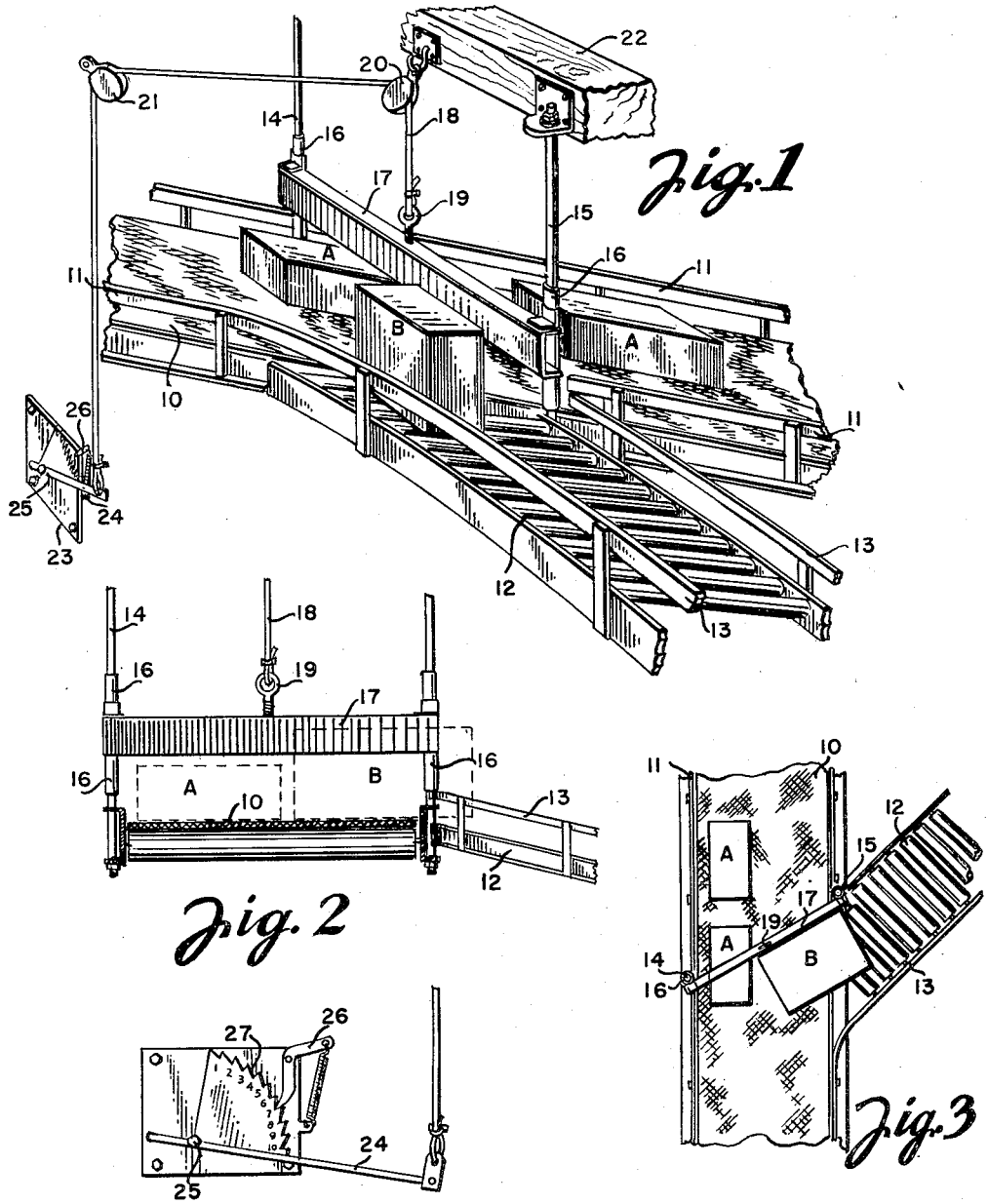

2,701,638

CONVEYER CARGO SELECTOR

John S. Petro, Racine, Wis., assignor to S. C. Johnson & Son, Inc., Racine, Wis.

Application March 19, 1951, Serial No. 216,307

1 Claim. (Cl. 209—90)

This invention relates to a conveyor cargo selector. More particularly, it relates to a conveyor cargo selector which selects nonrotatable cargo moving along a main conveyor and shunts such cargo to a tributary conveyor while allowing other cargo to continue to move upon the main conveyor causeway.

In commercial practice, most manufacturers of packaged goods market a variety of such items. According to the size and shape of the items and the number of units placed in the shipping carton, the shipping cartons likewise vary substantially in size. Usually the packaging of the sundry cartons is done in the same part or section of the plant, the cartons placed upon conveyors, and moved to the plant's shipping dock where the cartons are stacked in trucks or rail cars. When one conveyor carries cartons of various sizes and a carload of only one specific size is to be loaded, it is necessary that the cartons be separated at or near the shipping dock and only the desired cartons selected. Therefore, the conveyor cannot terminate in the car but some distance from it to permit selection.

An object of the present invention is to provide a selector for nonrotatable cargo moving upon a main conveyor carrying various-sized cartons, which selector will shunt cartons of one size onto a tributary conveyor, yet permit cartons of a different size to continue to be carried upon the main conveyor causeway.

A further object of the invention is to provide a selector for nonrotatable cargo which in effect will permit several sizes of cartons to move upon one conveyor from the plant packaging operation to the plant shipping dock, and thereupon separating the cargo according to size and shunting it to other conveyors leading into the truck or car to be loaded.

A further object is to provide an efficient automatic cargo selector which is relatively simple to operate, yet most inexpensive to manufacture and install.

Other objects of the present invention will become apparent in the course of the following specification.

In the drawing:

Figure 1 is a perspective view of the conveyor cargo selector and a fragmentary portion of the conveyor system.

Figure 2 is an end view of the conveyor cargo selector and a fragmentary portion of the conveyor system.

Figure 3 is a top view of the conveyor cargo selector and a fragmentary portion of the conveyor system.

Figure 4 is a front plan view of the ratchet gauge used in positioning the conveyor cargo selector at a predetermined height.

Similar numerals refer to similar parts throughout the several views.

Referring especially to Figure 1, it will be seen that the main conveyor causeway 10, shown as an endless belt type, has guide rails 11 affixed to its sides. A tributary conveyor, shown as a roller conveyor 12 and having guide rails 13, joins said main conveyor 10 at an acute angle to the direction of movement along the main conveyor.

Affixed to the margins of the main conveyor 10 are uprights 14 and 15, having slidably positioned thereupon sleeves 16. It will be noted that upright 14 extends upwardly from a point of the main conveyor 10 substantially in advance of upright 15. The spacing of these two uprights is such that the deflector member 17, movably carried upon the uprights by the sleeves 16, is at substantially the same angle to the flow of cargo upon the main conveyor 10 as is the tributary conveyor 12.

A cable 18 extends from the deflector member 17 and is attached thereto in any suitable manner such as by means of an eye screw 19. The cable 18 rides upon pulleys 20 and 21.

Pulley 20 is secured by extending it from the crosspiece 22, while pulley 21 may be suspended from the ceiling above the mechanism. If desired, depending upon the individual installation, pulley 21 may be eliminated and the cable 18 brought directly from the pulley 20 to the ratchet gauge 23.

The gauge 23 includes an arm 24 to which the cable 18 is attached. The arm 24 operates on a pivot 25 and carries a reciprocating pawl 26. A plurality of teeth 27 are immovably positioned so as to individually receive the reciprocating pawl 26.

In operation, cartons of a particular size (designated as A in the drawing) and cartons of a larger size (designated as B) proceed together along the main conveyor 10. The attendant, knowing the width of A, sets the reciprocating pawl 26 in one of the teeth 27 which will provide a clearance under the deflector member 17 for A, yet cause B, the larger carton, to come into contact therewith. For example, knowing that the thickness of A is three and one-half inches, the attendant engages the pawl 26 in the tooth marked "4," said member designating a four inch clearance under the deflector member 17. Thereupon, the carton A will pass under the deflector member and proceed to the rail car or truck to be loaded. The larger cartons B will be deflected onto the tributary conveyor 12 and move on to the loading point.

It should be appreciated that the sleeves 16 and the deflector member 17, carried by the uprights 14 and 15, may be elevated or lowered by means other than the pulley and cable arrangement described herebefore. For example, the cable 18 may be removed and the sleeves manually moved upon the uprights and held secure in the selected position by screws or pegs. It is obvious, however, that such a method is not convenient and I prefer the use of cable and gauge.

Thus, in accordance with my invention, I have provided a most efficient conveyor cargo selector which may be easily installed and inexpensively constructed.

I wish it understood that I do not desire to be limited to the exact details of construction shown and described, for obvious modifications will occur to a person skilled in the art.

I claim:

In a nonrotatable cargo conveying system having a main conveyor and a tributary conveyor joining said main conveyor extending at an acute angle from said main conveyor, a cargo selector, said cargo selector having two upright members affixed to the margins of said main conveyor and rising perpendicularly therefrom, a deflector permanently positioned between and movably affixed to said upright members, said deflector lying in a plane which defines an angle to the flow of cargo upon the main conveyor substantially the same as that defined at the juncture of said tributary conveyor, a gauge for measuring and adjusting the position of said deflector upon said uprights, and a cable connecting said deflector and said gauge.

References Cited in the file of this patent

UNITED STATES PATENTS

| | | |
|---|---|---|
| 1,655,476 | Regan | Jan. 10, 1928 |
| 1,693,014 | Anderson | Nov. 27, 1928 |
| 1,712,872 | Cowley | May 14, 1929 |
| 1,917,004 | Worrall | July 4, 1933 |
| 1,930,318 | Mojonnier | Oct. 10, 1933 |
| 2,329,873 | Buzby | Sept. 21, 1943 |
| 2,505,283 | Fenton | Apr. 25, 1950 |
| 2,528,868 | Dederich | Nov. 7, 1950 |
| 2,570,395 | Siegal | Oct. 9, 1951 |

FOREIGN PATENTS

| | | |
|---|---|---|
| 307,852 | Great Britain | Mar. 14, 1929 |